(12) United States Patent
Ozkan et al.

(10) Patent No.: US 10,211,449 B2
(45) Date of Patent: Feb. 19, 2019

(54) BATTERY ELECTRODE AND METHOD

(71) Applicant: The Regents of the University of California, Oakland, CA (US)

(72) Inventors: Cengiz S. Ozkan, San Diego, CA (US); Mihrimah Ozkan, San Diego, CA (US); Zachary Favors, Corona, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/313,510

(22) PCT Filed: May 20, 2015

(86) PCT No.: PCT/US2015/031808
§ 371 (c)(1),
(2) Date: Nov. 22, 2016

(87) PCT Pub. No.: WO2015/179541
PCT Pub. Date: Nov. 26, 2015

(65) Prior Publication Data
US 2017/0194630 A1  Jul. 6, 2017

Related U.S. Application Data

(60) Provisional application No. 62/113,921, filed on Feb. 9, 2015, provisional application No. 62/001,952, filed on May 22, 2014.

(51) Int. Cl.
*H01M 4/00* (2006.01)
*H01M 4/134* (2010.01)
(Continued)

(52) U.S. Cl.
CPC ......... *H01M 4/134* (2013.01); *H01M 4/0469* (2013.01); *H01M 4/0471* (2013.01);
(Continued)

(58) Field of Classification Search
CPC .... H01M 4/134; H01M 4/625; H01M 4/0483; H01M 4/0471; H01M 4/1395; H01M 4/382; H01M 4/366
See application file for complete search history.

(56) References Cited

U.S. PATENT DOCUMENTS

2009/0305135 A1  12/2009 Shi et al.
2010/0330419 A1  12/2010 Cui et al.
(Continued)

FOREIGN PATENT DOCUMENTS

GB       2502625      12/2013
KR   1020170009967   1/2017
(Continued)

OTHER PUBLICATIONS

International Application Serial No. PCT/US2015/031808, International Search Report and Written Opinion dated Oct. 7, 2015, 9 pgs.
(Continued)

*Primary Examiner* — Cynthia H Kelly
*Assistant Examiner* — Monique M Wills
(74) *Attorney, Agent, or Firm* — Schwegman Lundberg & Woessner, P.A.

(57) ABSTRACT

A silicon based micro-structured material and methods are shown. In one example, the silicon based micro-structured material is used as an electrode in a battery, such as a lithium ion battery, we have successfully demonstrated the first synthesis of a scalable carbon-coated silicon nanofiber paper for next generation binderless free-standing electrodes for Li-ion batteries that will significantly increase total capacity at the cell level. The excellent electrochemical performance coupled with the high degree of scalability rriake this material an idea candidate for next-generation anodes for electric vehicle applications. C-coated SiNF paper electrodes offer a highly feasible alternative to the traditional
(Continued)

slurry-based approach to Li-ion battery electrodes through the elimination of carbon black, polymer binders, and metallic current collectors.

14 Claims, 8 Drawing Sheets

(51) Int. Cl.
    *H01M 4/04*     (2006.01)
    *H01M 4/1395*     (2010.01)
    *H01M 4/38*     (2006.01)
    *H01M 4/62*     (2006.01)
    *H01M 10/0525*     (2010.01)
    *H01M 4/36*     (2006.01)
    *H01M 10/0569*     (2010.01)
    *H01M 4/02*     (2006.01)

(52) U.S. Cl.
CPC ....... *H01M 4/0483* (2013.01); *H01M 4/1395* (2013.01); *H01M 4/366* (2013.01); *H01M 4/382* (2013.01); *H01M 4/386* (2013.01); *H01M 4/625* (2013.01); *H01M 10/0525* (2013.01); *H01M 10/0569* (2013.01); *H01M 2004/021* (2013.01); *H01M 2300/0037* (2013.01); *Y02E 60/122* (2013.01); *Y02T 10/7011* (2013.01)

(56) References Cited

U.S. PATENT DOCUMENTS

| | | | |
|---|---|---|---|
| 2012/0121989 A1 | 5/2012 | Roberts et al. | |
| 2012/0295155 A1* | 11/2012 | Deng | H01B 1/122 429/200 |
| 2013/0078508 A1* | 3/2013 | Tolbert | H01M 4/134 429/188 |
| 2013/0189575 A1* | 7/2013 | Anguchamy | C01B 33/023 429/211 |
| 2013/0224583 A1* | 8/2013 | Green | B82Y 30/00 429/211 |
| 2013/0233781 A1* | 9/2013 | Olesik | G01N 30/94 210/198.3 |
| 2013/0252101 A1 | 9/2013 | Zhou et al. | |

FOREIGN PATENT DOCUMENTS

WO    WO-2013130690 A1    9/2013
WO    WO-2015179541 A1    11/2015

OTHER PUBLICATIONS

International Application Serial No. PCT/US2015/031808, Invitation to Pay Additional Fees and Partial Search Report dated Jul. 27, 2015, 2 pgs.

"International Application Serial No. PCT/US2015/031808, International Preliminary Report on Patentability dated Dec. 1, 2016", 6 pgs.

"European Application Serial No. 15796417.2, Extended European Search Report dated Sep. 20, 2017", 7 pgs.

Krissanasaeranee, Methira, "Preparation of Ultra-Fine Silica Fibers Using Electrospun Poly(Vinyl Alcohol)/Silatrane Composite Fibers as Precursor", Journal of the American Ceramic Society, 91(9), (2008), 2830-2835.

European Application Serial No. 15796417.2, Response filed Apr. 17, 2018 to Extended European Search Report dated Sep. 20, 2017, 4 pgs.

* cited by examiner

BATTERY ELECTRODE AND METHOD

RELATED APPLICATION

This application is a U.S. National Stage Filing under 35 U.S.C. 371 from International Application No. PCT/US2015/031808, filed on May 20, 2015, and published as WO 2015/179541 A1 on Nov. 26, 2015, which claims priority to U.S. Provisional Patent Application No. 61/113,921, entitled "BATTERY ELECTRODE AND METHOD," filed on Feb. 9, 2015, and to U.S. Provisional Patent Application No. 62/001,952, entitled "BATTERY ELECTRODE AND METHOD," filed on May 22, 2014, each of which is incorporated herein by reference in its entirety.

TECHNICAL FIELD

This invention relates to silicon based material microstructures and methods. In one example, this invention relates to silicon based anodes for lithium ion batteries.

BACKGROUND

Improved batteries, such as lithium ion batteries are desired. One example of a battery structure that can be improved is an anode structure.

DETAILED DESCRIPTION

Figure 1:
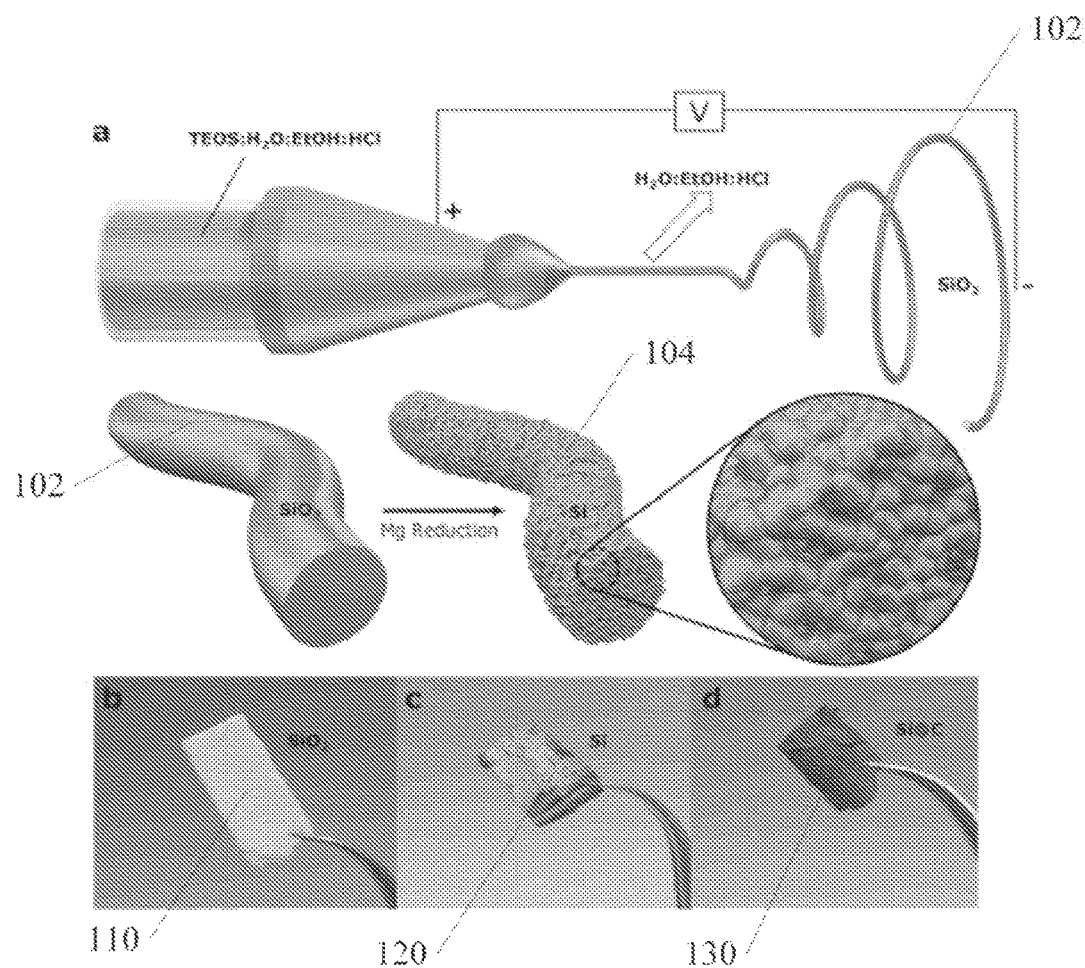
FIG. 1 shows examples of a process of forming a coated porous silicon fiber material according to an example of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention.

Silicon is widely considered as the successor to graphite-based anodes for Li-ion batteries given its highest theoretical capacity among known materials of 3579 mAh $g^{-1}$, which corresponds to an ambient temperature formation of $Li_{15}Si_4$. The large amount of attention garnered by Si as an anode material is also due to its high abundance as a rock-forming element, non-toxicity, and environmental benignity. Silicon's ability to alloy with large amounts of Li leads to volume expansion in excess of 300%, which can pulverize active material, deteriorate electrical connectivity, and degrade the solid electrolyte interphase (SEI) layer. These phenomena can drastically reduce the cycle life and capacity of Si-based anodes. Si can fracture upon lithiation when the characteristic dimension is as small as 150 nm. Scaling of Si nanostructures below this critical dimension affords avoidance of active material fracture and pulverization. However, expansion and contraction of Si during cycling may lead to repeated fracturing and reformation of the SEI layer. Numerous nanostructures such as porous Si nanowires, double walled Si nanotubes, and porous Si nanoparticles (SiNPs) have all demonstrated effective preservation of the crucial SEI layer via control of the volume expansion of Si.

Silicon also suffers from low electrical conductivity, thus it may be used in conjunction with conductive matrices such as carbon nanotubes (CNTs), carbon nanofibers (CNFs), or conformal carbon coatings. Electrospinning can be used to produce carbonaceous nanofibrous matrices of wide ranges of composition for applications in energy storage. Polymers dissolved in organic solvents along with dispersed active material, such as Si or $Fe_2O_3$, can be electrospun to produce polymer fibers with embedded nanoparticles. However, these organic polymer-based fibers can require lengthy thermal oxidative stabilization (TOS) and carbonization steps for applications in energy storage devices.

Additionally, the final weight percent of active material in organic polymer based fibers can be much less than 50% which significantly reduces the total electrode capacity. A majority of the weight of the fibers corresponds to the conductive carbon matrix, which stores much less Li than the embedded active materials.

Li metal has garnered attention as a potential anode material for Li—S and Li-ion batteries based on its theoretical capacity of 3860 mAh $g^{-1}$, high conductivity as a metal, low density (0.59 g $cm^{-3}$), lowest negative electrochemical potential (−3.040 V vs. the standard hydrogen electrode), and lack of intercalation or diffusion of Li-ions as is required in Si-based and C-based anodes. The two most significant barriers to commercialization of these Li-metal anodes is the phenomena of Li dendrite growth and relatively low Coulombic efficiency (CE) via repeated consumption of Li and electrolyte. The formation of Li dendrites poses serious safety hazards due to the potential of short circuits and high surface area with repeated cycling. Despite surface treatments and the use of various electrolytes, the challenges of preventing Li dendrite growth and increasing the relatively low CE to >99.9% still require significant work to overcome.

In industrial settings, battery electrodes are produced via the slurry method in which metallic current collectors are coated with a slurry comprising an inactive polymer binder, carbon black, and active material dispersed in an organic solvent (usually NMP). However, the necessity of these metal current collectors and inactive polymer binders adds significant cost and weight to the final battery assembly, especially in large battery banks used in EVs. In order for a leap in full cell capacity to occur, significant changes in the way electrodes are manufactured must take place in addition to the introduction of high capacity materials such as Si. Herein, we report on the first synthesis of a binderless free-standing Si nanofiber (SiNF) paper with a Si weight percent in excess of 80% for application as Li-ion battery anodes, which forgoes the need for inactive polymer binders or metallic current collectors.

Improved silicon based structures are desired to address fracturing and other technical challenges with silicon based battery electrodes. One example material that addresses these technical challenges is introduced in FIG. 1.

FIG. 1(a) shows a schematic representation of an electrospinning process and subsequent magnesiothermic reduction. A silicon oxide fiber 102 is first formed. In one example, the silicon oxide fiber 102 is formed using an electrospinning process, although the invention is not so limited. Any suitable silicon oxide fiber fabrication technique may be used. Next, the silicon oxide fiber 102 is reduced to form a silicon fiber. In one example, the silicon oxide fiber is magnesiothermically reduced, although other reduction reactions may also be used. After reduction, the silicon fiber may also be etched to produce a porous fiber. In one example, an HF etch may be used to form a porous silicon fiber.

As shown in FIG. 1(b), in one example, a silicon oxide fiber paper 110 is formed from the silicon oxide fibers 102. After reduction and etching, a porous silicon fiber paper 120 is formed as shown FIG. 1(c). In one example, the porous silicon fiber paper 120 is then coated with a conductive coating to form a coated silicon paper 130 as shown in FIG. 1(d). Examples of conductive coatings include, but are not limited to, pyrolized carbon, metallic coatings, metallic compound coatings, and other conductive materials.

As discussed above, in one example, the silicon oxide fibers 102 are formed using an electrospinning process. In one example, two separate solutions comprising TEOS:EtOH (1:2) and H2O:HCl (1000:1) are prepared. The $H_2O$:HCl solution is then added drop-wise into the TEOS:EtOH solution under vigorous stirring. The combined solution is then aged at 70° C. until the desired viscosity is obtained. After cooling, the solution is loaded into a syringe and electrospun at 30 kV with a working distance of 10 cm from tip to collector plate. During electrospinning, TEOS undergoes polymerization in situ when the fiber travels from the Taylor cone to the collector plate. The as-spun $SiO_2$ NFs form a paper that is easily peeled off of the collector plate. The $SiO_2$ NF paper sheets are dried under vacuum at 200° C. for 1 hour to remove any remaining $H_2O$ and EtOH. Noticeable shrinkage is observed during drying, suggesting the fibers may contain non-negligible amounts of $H_2O$ and EtOH or that the polymerization may be partially incomplete. Despite this small level of shrinkage, the sheets retain their original shape and do not undergo any noticeable cracking or warping. The thickness of the $SiO_2$ NF paper can be tuned simply by increasing or decreasing the spinning time. An hour of spinning can produce sheets with thicknesses of several millimeters and masses of several grams depending on the flow rate and number of nozzles used. The ability to produce fibers at these levels suggest a high degree of scalability. It is important to note that the $SiO_2$ NFs do not require lengthy thermal oxidative stabilization or carbonization processes like polymer-based NFs require for energy storage applications.

As discussed above, in one example, the silicon oxide fibers 102 are reduced using a magnesiothermic reduction process. In one example, $SiO_2$ NF paper is magnesiothermically reduced to Si to produce a porous 3D network of nano-Si. Briefly, $SiO_2$ NF paper is loaded into Swagelok-type stainless steel reactors with ~50 mesh Mg powder in a 1:1 weight ratio in an Ar-filled glovebox. Reactors are loaded into a quartz tube furnace and the system is heated to 650° C. at 5° C. $min^{-1}$ and held for 2 hours. After cooling, as-reduced SiNF paper is submerged in a 1M HCl solution to eliminate the unwanted reaction products of MgO and $Mg_2Si$. No signs of $Mg_2Si$ were noticed during the etching process, due to the absence of the evolution of pyrophoric $SiH_4$. SiNF paper is then submerged in a 10% HF solution for 1 hour to remove unreacted $SiO_2$. After etching and washing the SiNF paper assumes a yellow-orange hue, as in FIG. 1c.

As discussed above, in one example, the porous silicon fibers are coated with a conductive coating to form a coated silicon fiber, that may be formed as a paper. Despite its high theoretical capacity, Si is a semiconductor and, thus, lacks the conductivity of C-based materials. In one example, of a carbon conductive coating, in order to increase the surface conductivity of the SiNFs, the papers are loaded into a quartz tube furnace and C-coated. Briefly, the system is purged with a mixture of Ar/H2 and then ramped to 950° C. in 25 minutes. $C_2H_2$ is then introduced in a 1:1 $C_2H_2$:$H_2$ flow rate ratio where pyrolization occurs for 20 minutes. This C-coating procedure produces a conformal 4 nm amorphous carbon layer on all exposed Si surfaces. After C-coating, the papers assume a black appearance as in FIG. 1d.

Figure 2:
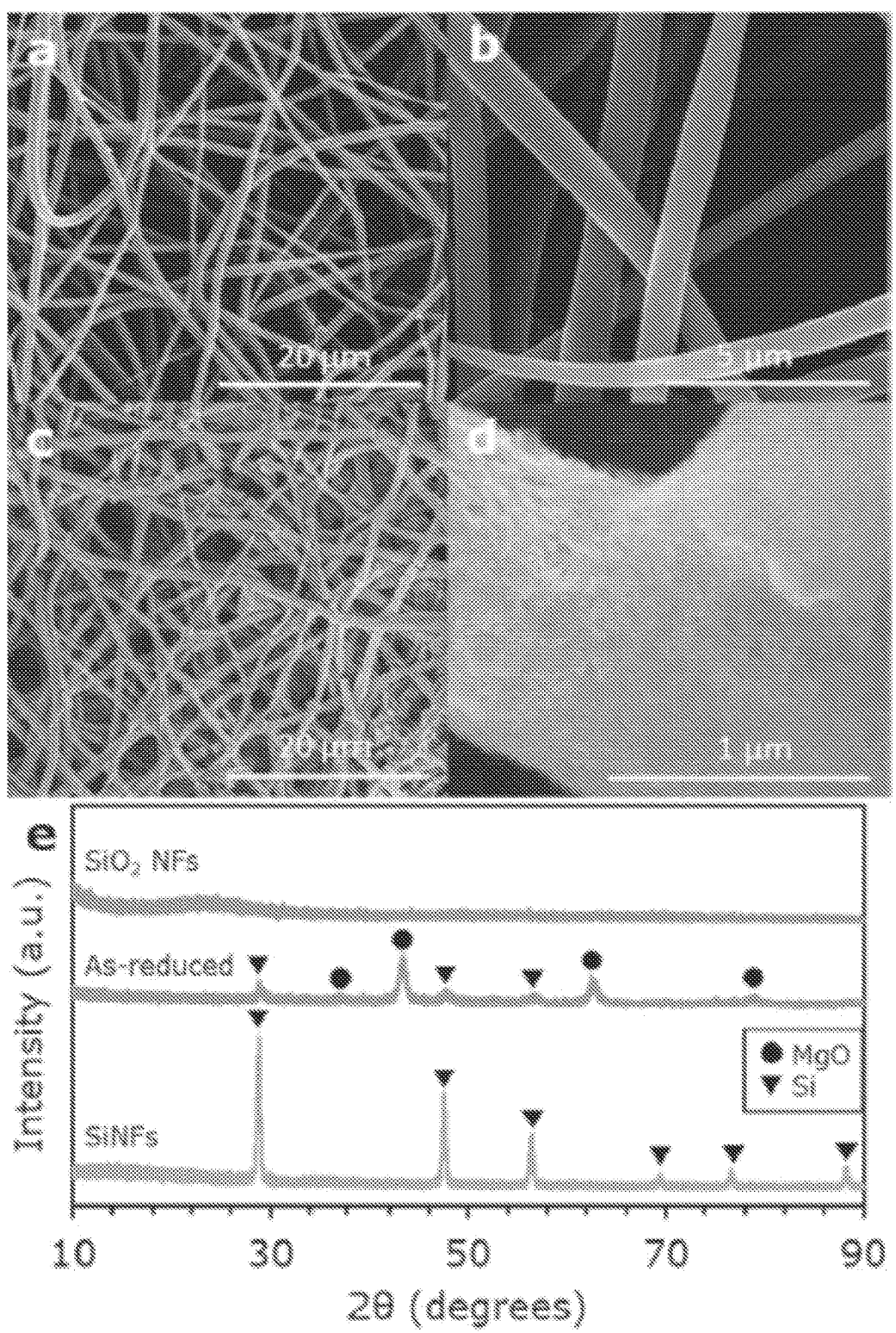
FIG. 2 shows Scanning Electron Microscope (SEM) images of porous silicon fiber materials in various stages of production according to an example of the invention.

FIG. 2 shows Scanning Electron Microscope (SEM) images of (a) as-spun $SiO_2$ NFs, (b) as-spun $SiO_2$ NFs under high magnification, (c) SiNFs after etching, (d) SiNFs under magnification showing detail of surface morphology. Scale bars are 20 μm, 5 μm, 20 μm, and 1 μm for (a)-(d), respectively. (e) XRD plot showing peaks associated with NFs at various synthesis steps.

Figure 3A:
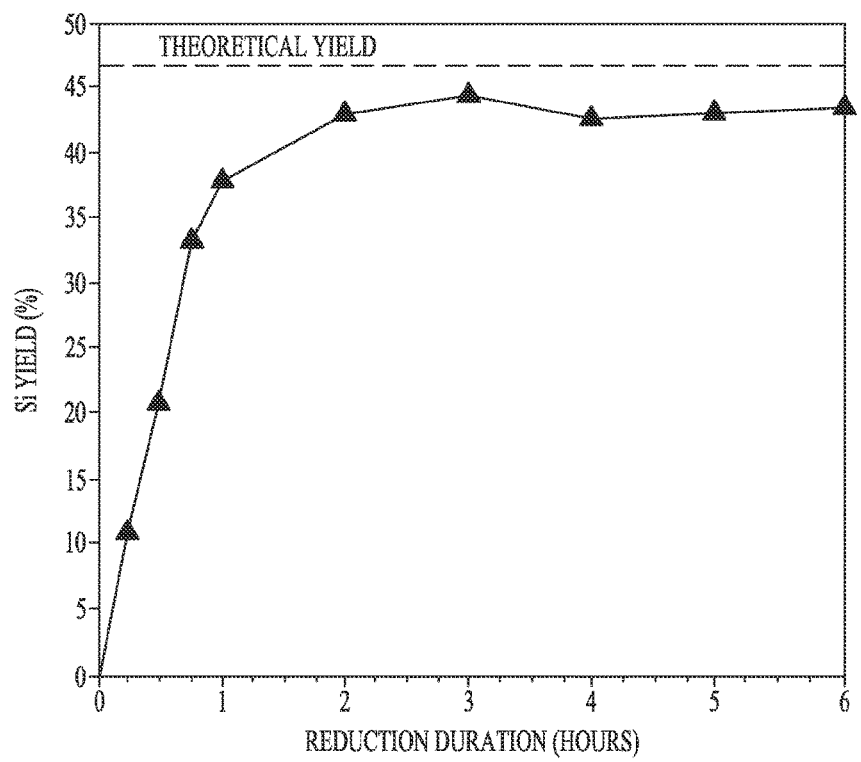
FIG. 3a shows yield data for materials according to an example of the invention.

SEM imaging in FIGS. 2a and 2b shows the morphology of as-spun $SiO_2$ NFs. XRD data in FIG. 2e reveals the amorphous nature of the as-spun $SiO_2$ NFs. There is no evidence of nanoparticle-like $SiO_2$ structures, which are commonly produced via the Stöber method; instead, the $SiO_2$ NFs are an amorphous, solid network of silica. $SiO_2$ NF paper is then cut into strips and loaded into steel-capped brass union Swagelok reactors with ~50 mesh Mg powder in a $SiO_2$:Mg weight ratio of 1:1. The reactors are sealed in an Ar-filled glovebox (0.05 ppm $O_2$) and immediately transferred to an MTI GSL1600X quartz tube furnace. The furnace is purged with Ar and heated at 5° C./min to 700° C. and held for 2 hours to ensure complete reaction of Mg and $SiO_2$. A 2 hour reduction corresponds to a yield of 43.2%, which is very near the theoretical yield of Si from $SiO_2$ (46.7%), as in FIG. 3a. Beyond this time only marginal gains in yield are achieved, thus it is not necessary to reduce for longer periods of time. Yield data was calculated by measuring the weight of the etched SiNF paper in comparison to the weight of the original $SiO_2$ NF paper.

XRD data in FIG. 2e reveals the existence of both MgO and Si, as expected, in the as-reduced SiNF paper. The reduced NF paper is submerged in 2M HCl for 3 hours to remove the reaction products MgO and possibly $Mg_2Si$. No evidence of $SiH_4$ was observed, suggesting minimal or no $Mg_2Si$ was formed. Etched SiNF paper assumes a brownish-yellow color as in FIG. 1c.

Figure 3B:
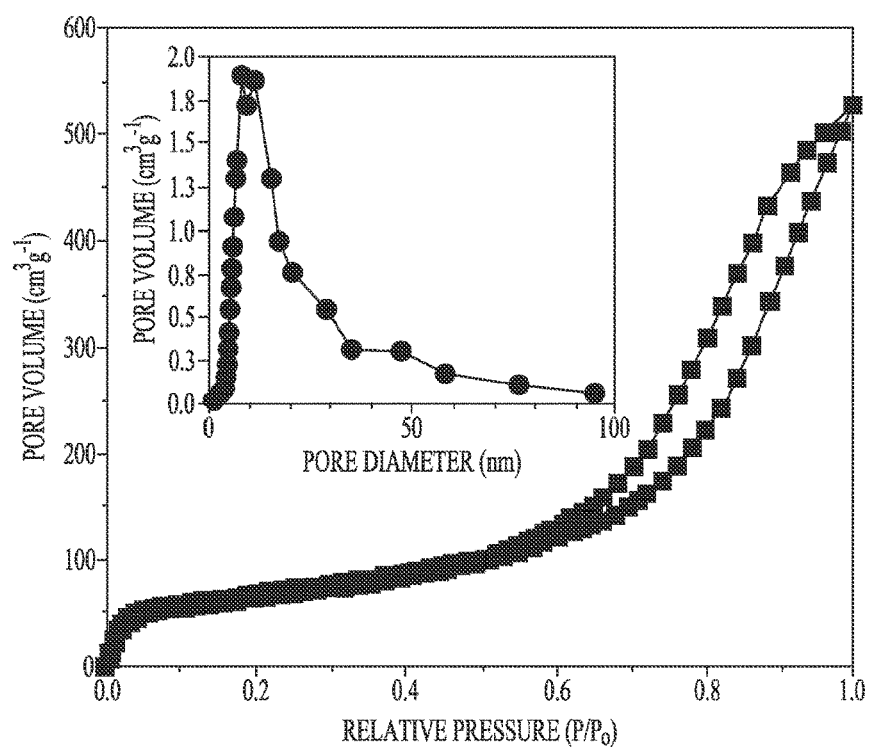
FIG. 3b shows data relating to porosity for materials according to an example of the invention.

After rinsing the SiNF paper several times in EtOH and $H_2O$, the sheets are dried under vacuum at 105° C. overnight. SiNF paper after etching can be seen in the SEM images in FIGS. 2c and 2d. In contrast to the solid $SiO_2$ NFs, SiNFs have a noticeable porosity that exists throughout the diameter of the fiber, as evidenced in the fractured SiNF in FIG. 2d. This porosity is derived from the selective etching of MgO and possibly $Mg_2Si$ sites. XRD data in FIG. 2e reveals the existence of crystalline Si after etching of reaction products. Brunauer-Emmett-Teller (BET) surface area measurements in FIG. 3b confirm the existence of a large population of mesopores centered around ~10 nm and a relatively high surface area of 281 $m^2g^{-1}$. The Figure shows BET surface area measurements of SiNF paper with type IV $N_2$ sorption isotherms and inset showing the distribution of pore diameters. The pore distribution is in good agreement with the TEM images in FIG. 4.

Figure 4:
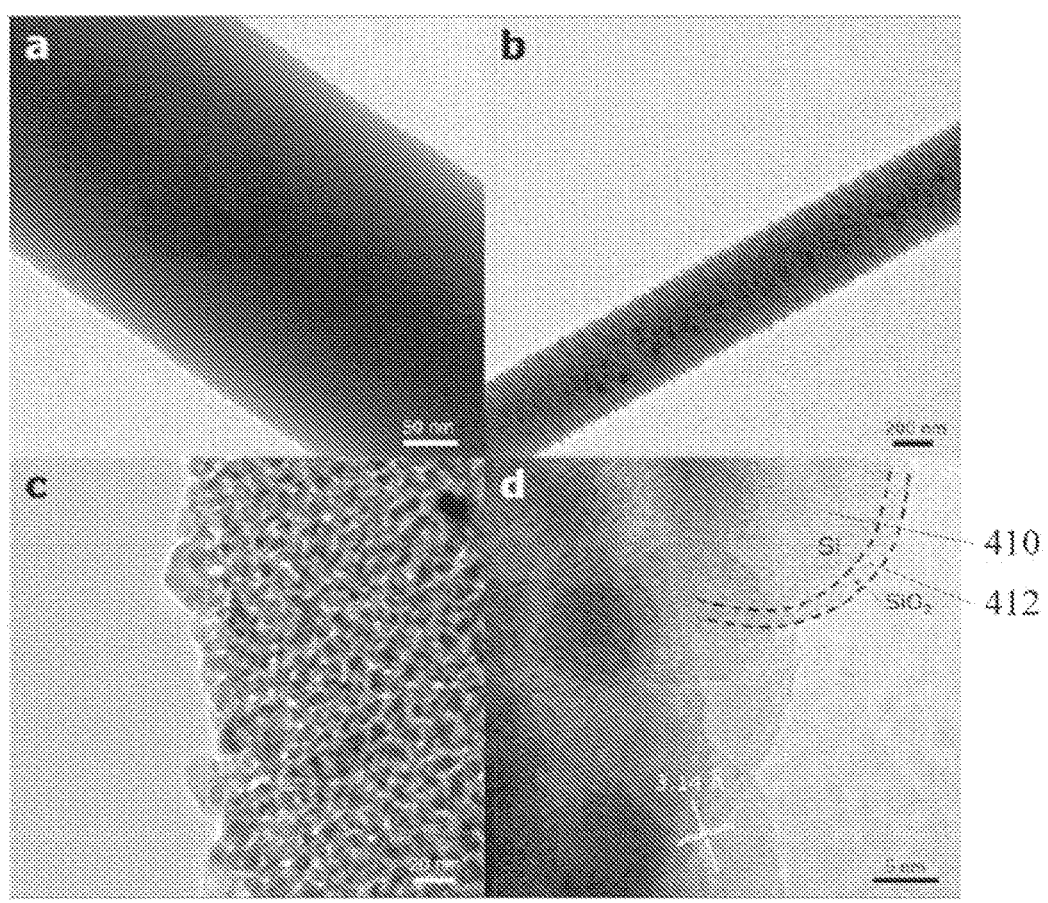
FIG. 4 shows transmission electron microscopy images of materials according to an example of the invention.

TEM imaging in FIG. 4 reveals the morphology of the fibers before and after Mg reduction. No porosity is observed in the $SiO_2$ NFs, as in FIG. 4a, which reveals a uniform solid fiber. After reduction and etching the SiNFs assume a highly porous morphology as evidenced in FIGS. 4b and 4c. This porous structure is present throughout the thickness of the fibers, which was previously observed in the SEM images in FIGS. 2d and 2e. The High Resolution Transmission Electron Microscope (HRTEM) image in FIG. 4d reveals the presence of not only silicon nanoparticles 410 (SiNPs) but also the existence of a native $SiP_2$ shell 412 on SiNPs with a thickness of 1-2 nm. The $SiO_2$ shell 412 may not only serve to mitigate volume expansion effects experienced by the SiNPs 410 during lithiation, but it is also a lithiatable shell with a theoretical reversible capacity of 1961 mAh g$^{-1}$. The diameter of the interconnected SiNPs 410 that comprise the SiNFs are 8-25 nm, which is well below the critical size for the fracture of Si during lithiation. The small size of the SiNPs 410 also reduces the bulk diffusion length for Li into Si.

Due to silicon's low conductivity, we applied a conductive coating, for example, a ~4 nm carbon coating to all SiNF paper electrodes to enhance the surface conductivity of the electrodes. SiNF paper was loaded into a quartz tube furnace in a quartz boat and heated to 950° C. in 15 minutes under a flow of Ar:$H_2$ at 700 torr. At 950° C., $C_2H_2$ was introduced for 15 minutes and then the system was cooled to room temperature under flow of Ar:$H_2$. The C-coated electrodes assume a black color as in FIG. 1d. Weighing after C-coating reveals a carbon content of ~18.5% with the remainder corresponding to Si. C-coated SiNF paper electrodes were used as-is without the addition of acetylene black or a binder and were cut down to fit inside of 2032-type coin cells. Li metal was used as the counterelectrode with a 1:1 EC:DMC (v:v) electrolyte with a 3% vol. VC additive for improved cycle life, and Celgard PP was used for the separators.

FIG. 5 shows (a) Cycling data for C-coated SiNFs 502 compared to uncoated SiNFs 506 at C/10 (1 C=4 A g$^{-1}$). (b) Cyclic voltammogram for select cycles for C-coated SiNFs using a scan rate of 0.05 mV s$^{-1}$ (c) Charge-discharge curves for select cycles for C-coated SiNFs. (d) C-rate data for C-coated SiNFs at select rates. (e) PEIS curves for select cycles for C-coated SiNFs with inset showing equivalent circuit used for modelling. (f) Resistance data for select cycles for C-coated SiNFs, with inset graph displaying ESR values.

Charge-discharge cycling was performed on an Arbin BT300 and cyclic voltammetry (CV) and electrochemical impedance spectroscopy (EIS) measurements were performed on a Biologic VMP3. All capacity values were calculated on the total electrode weight (carbon+silicon).

Figure 5A:
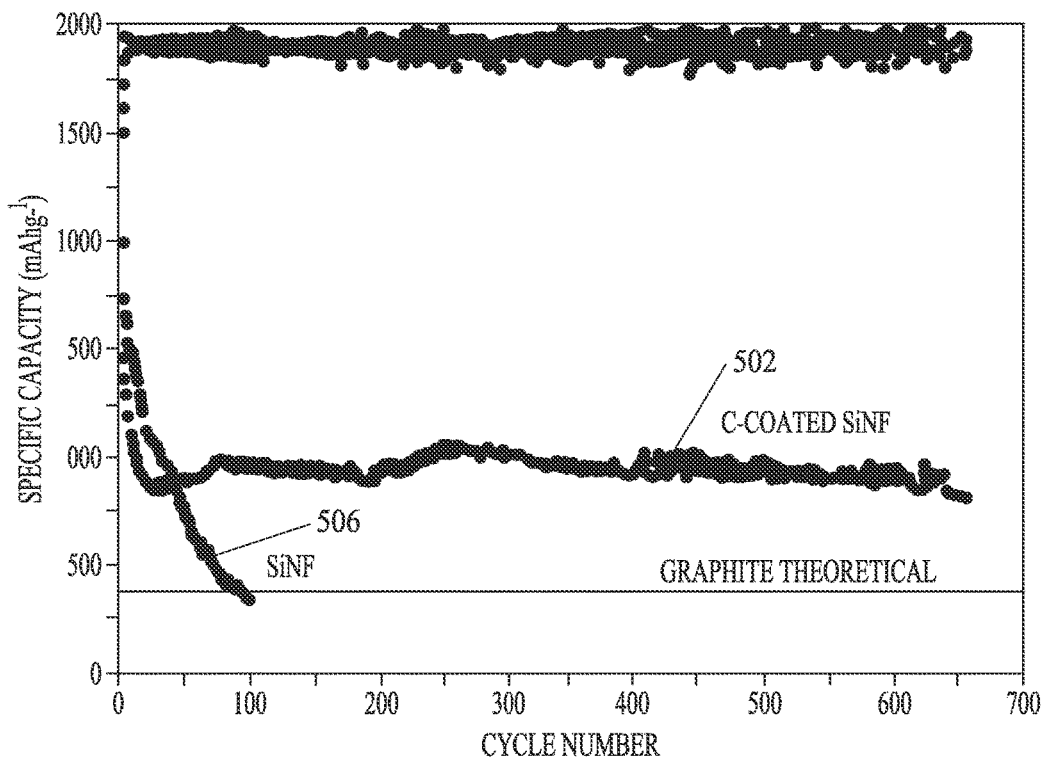
FIG. 5 shows data relating to electrical testing of a battery using materials according to an example of the invention.

Charge-discharge cycling in FIG. 5a reveals the excellent performance of the C-coated SiNF electrodes (502) over 659 cycles, with minimal capacity fading after the first 20 cycles. Even after 659 cycles, the SiNF electrodes can deliver a reversible capacity of 802 mAh g$^{-1}$ with a Coulombic efficiency of 99.9%. We attribute this excellent stability to the internal porosity of the SiNFs, which allows for internal volume expansion of the small SiNPs. This internal expansion of Si within the SiNFs effectively preserves the crucial SEI layer that coats the outside of the SiNFs. The existence of the native oxide shell and C-coating also contribute to mitigating volume expansion related effects through creation of a buffer layer. For comparison, cycling data for bare uncoated SiNFs (506) is presented in FIG. 5a to emphasize the importance of the C-coating process. The capacity rapidly decays below the theoretical capacity of graphite within 100 cycles when no coating is present.

Figure 5B:
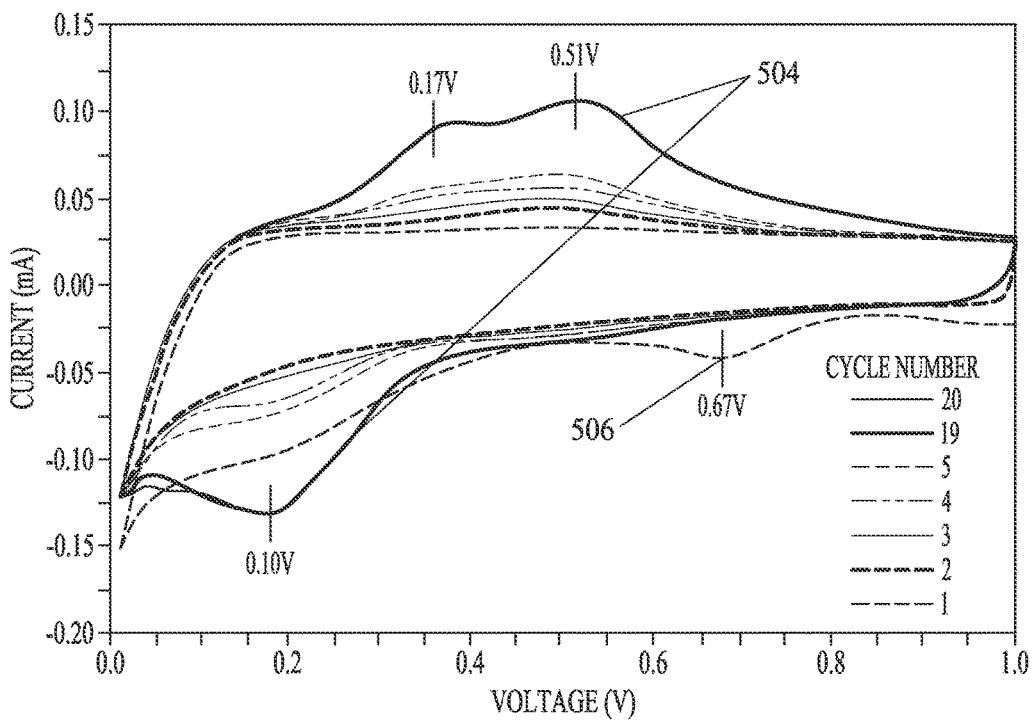

CV measurements in FIG. 5b demonstrate the activation process of the electrodes over the first 20 cycles. The 19$^{th}$ and 20$^{th}$ cycle curves 504 largely coincide with each other, which signals the stabilization of the electrode. This activation process may be due to the gradual lithiation of the native $SiO_2$ shell and SiNPs located in the interior regions of the NFs. The peak associated with the formation of SEI 506 occurs at 0.67 V and is non-existent in subsequent cycles. Peaks closely associated with the dealloying (0.51 V and 0.37 V) and alloying (0.18 V) of Si sharpen with increased cycling, confirming the existence of the activation process. After activation for 20 cycles to allow for capacity stabilization, C-rate testing was performed on C-coated SiNFs, as in FIG. 5d. Even up to the C/5 rate, C-coated SiNFs outperform the theoretical capacity of graphite.

Figure 5C:
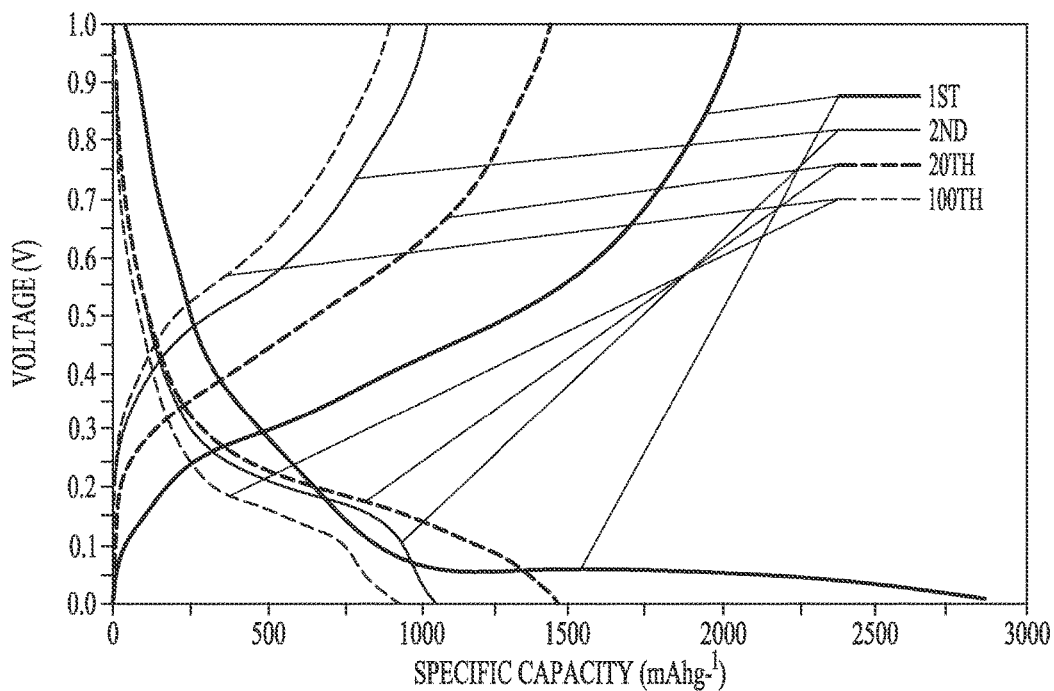
Figure 5D:
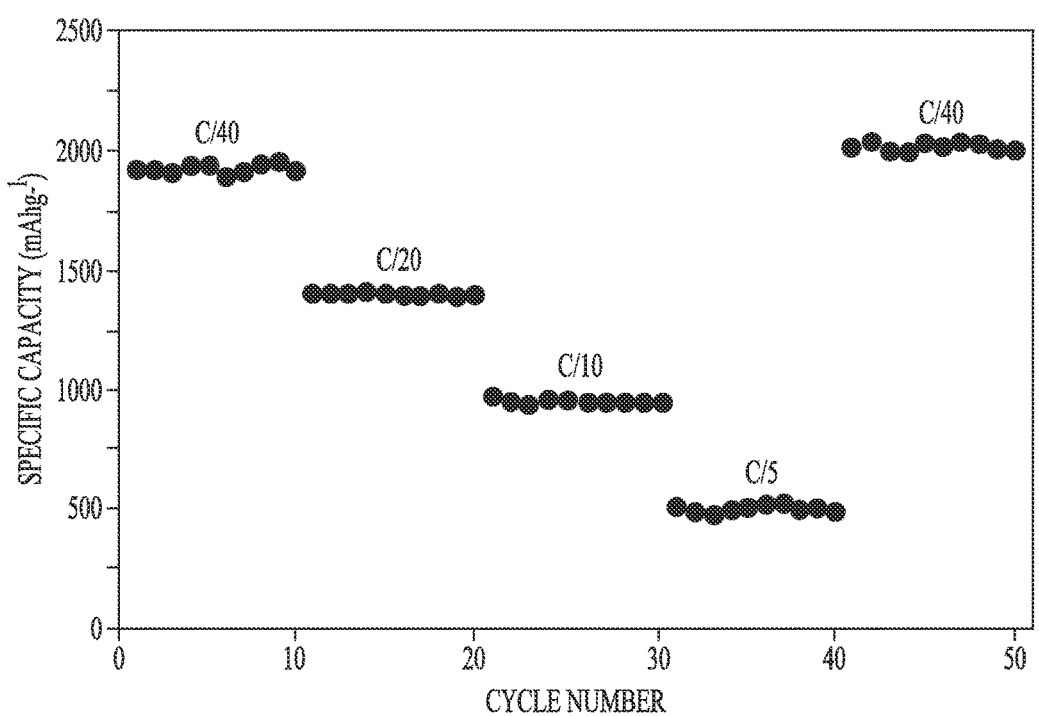
Figure 5E:
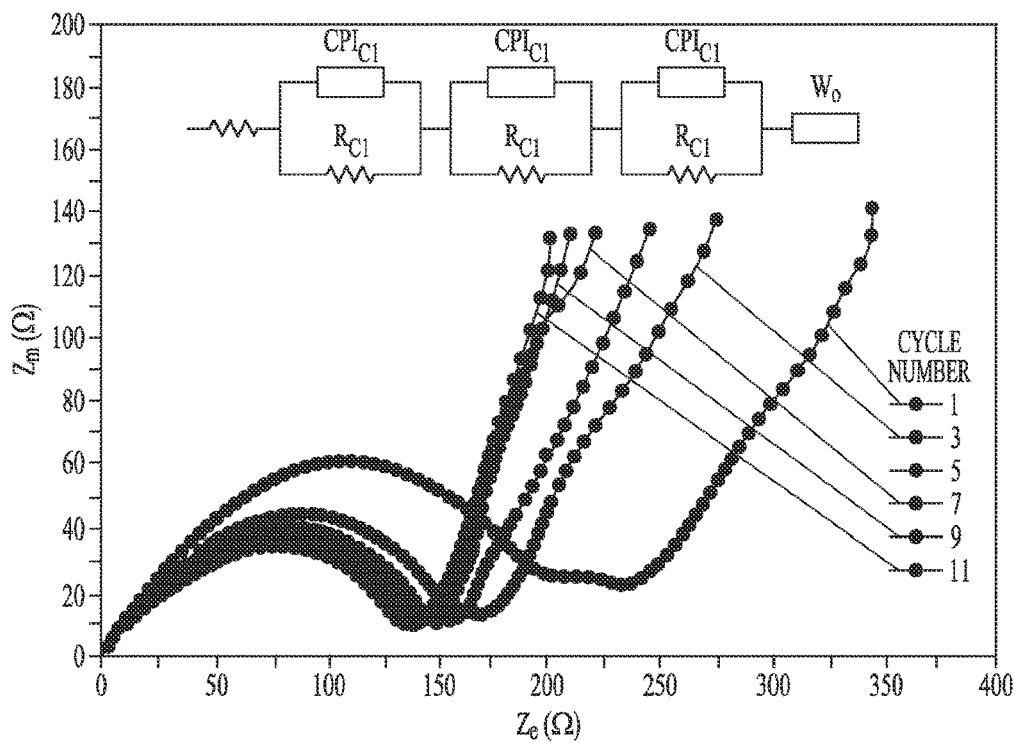
Figure 5F:
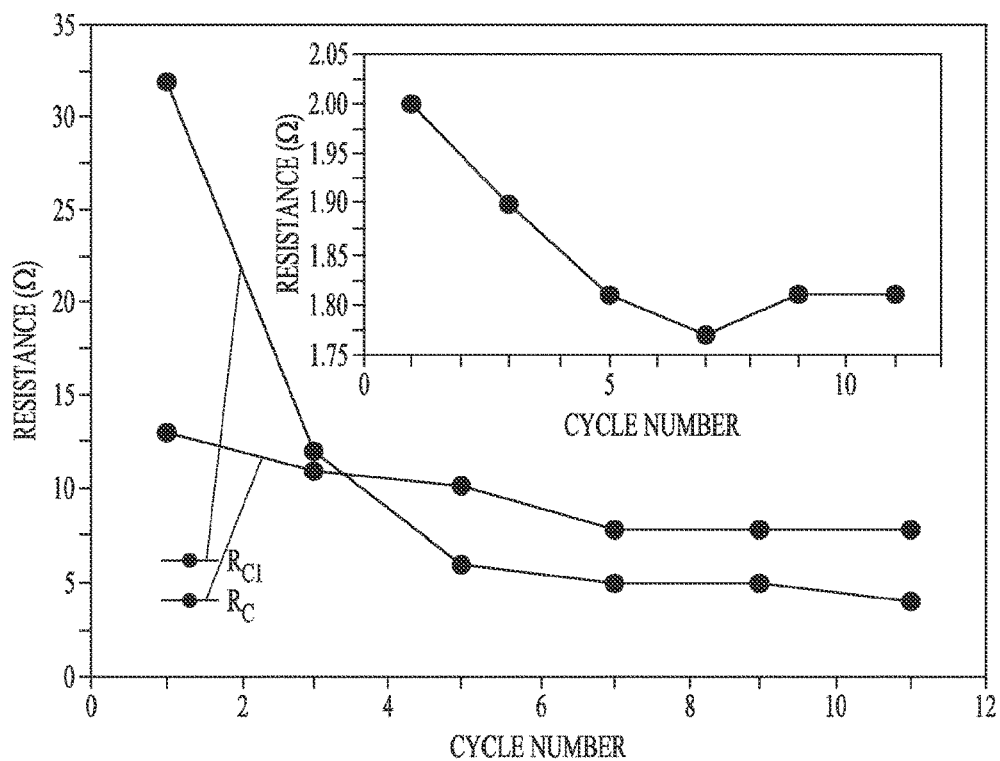

The 1$^{st}$ cycle is performed at C/40 and the 2$^{nd}$ at C/20 in order to allow for activation of a majority of the active material while fostering the formation of a well-structured SEI. The SiNF paper electrodes have the remarkable benefit of having no metallic current collectors or polymer binders. When the copper foil weight is taken into account in the slurry-based electrodes, the capacity is significantly lower than reported. Additionally, all of our capacity values are reported on a total electrode weight basis, unlike much of the reported values in literature which exclude weight contributions of carbon additives, binders, or current collectors. In this sense, our SiNF electrodes outperform the slurry-based electrodes if the weight of the copper foil is taken into account. The SiNF paper has a loading of Si in excess of 80% by weight and is a completely binder-free approach. SiNF paper electrodes demonstrate excellent Coulombic efficiencies between 99-100% after the first three cycles. Charge-discharge curves in FIG. 5c are in good agreement with the CV curves and demonstrate the low discharge potential of the SiNF electrodes. EIS measurements in FIG. 5e also coincide with the activation process of the electrodes during initial cycling.

In particle configurations, such as a core-shell structured SiNPs@$TiO_{2-x}$/carbon composite Li-ion anode material, the long-range 3D nanofiber network produced during electrospinning is destroyed via turning the fibers into a powder which is then cast in a slurry cast method onto Cu foil. In contrast anodes formed using method as described in the present disclosure can provide nearly four times the gravimetric capacity based on consideration of the weight of all anode components.

Potentiostatic EIS was used to analyze interfacial and diffusion related kinetics in the SiNF electrodes in the delithiated state. The equivalent circuit used in this work, as in FIG. 5e, contains the following major components: i) equivalent series resistance (ESR), ii) contact impedance within the active material ($R_C$ and $CPE_C$), iii) impedance due to the SEI layer formation ($R_{SEI}$ and $CPE_{SEI}$), iv) interfacial impedance at the surface of the NFs ($R_{CT}$ and $CPE_{DL}$), and v) diffusion impedance ($W_O$). Constant phase elements (CPEs) are used to describe non-ideal capacitances that arise due to non-uniformity in the size and shape of the NFs. EIS data for select initial cycles is plotted in FIGS. 5e and 5f. All associated resistances tend to decrease initially and then stabilize, which coincides with the activation and stabilization of the electrode. Charge transfer resistance decreases the most drastically, with a 700% reduction from the 1$^{st}$ to the 11$^{th}$ cycle. The decrease of resistances such as ESR and $R_C$ is a result of the electrode activation process, where the conductivity between SiNPs is enhanced. The lithiation of the native oxide shell may also enhance the conductivity between the interconnected SiNPs with cycling. The extraordinarily low ESR of these electrodes relative to other published Si anodes is most likely due to the absence of a polymer binder and existence of very large void spaces between SiNFs, which permits relatively facile Li-ion travel. The very low charge transfer resistance can be attributed to the highly conductive C-coating.

The in situ polymerization of TEOS that occurs in-flight during the short travel distance of 12 cm from tip to collector plate, proceeds in the following general fashion in Eq. 1:

$$Si(EtOH)_4(l) + 2H_2O(l) \rightarrow SiO_2(s) + 4EtOH(l) \qquad (1)$$

In contrast to the conventional Stöber method, which may take as much as 24 hours to precipitate appreciable amounts of silica NPs, our in situ polymerization of TEOS in-flight is comparatively instantaneous. This may be due to the relatively high surface area for solvent evaporation afforded by the formation of a nanoscale fiber immediately proceeding the Taylor cone. The absence of silica NPs in the as-spun SiO$_2$ NFs also confirms this rapid polymerization of TEOS in-flight. Subsequent magnesiothermic reduction of the SiO$_2$ NFs proceeds as in Eq. 2 and removal of MgO proceeds as in Eq. 3:

$$SiO_2(s) + 2Mg(g) \rightarrow Si(s) + 2MgO(s) \qquad (2)$$

$$MgO(s) + 2HCl(l) \rightarrow MgCl_2(aq) + H_2O(l) \qquad (3)$$

It is worth noting that MgCl$_2$ can be recycled back into Mg via electrolysis, which is a common industrial route for producing Mg from brine. The Mg reduction route operates at a much lower operating temperature (700° C.) than carbothermal reduction, which requires electric arc furnaces operating at >2000° C. Carbothermal reduction is the predominant method used to produce metallurgical grade Si, but it is not a carbon neutral process in itself. Conversely, Mg reduction produces a solid, environmentally benign, and recyclable MgO product at much lower operating temperatures.

In conclusion, we have successfully demonstrated the first synthesis of a scalable carbon-coated silicon nanofiber paper for next generation binderless free-standing electrodes for Li-ion batteries that will significantly increase total capacity at the cell level. The excellent electrochemical performance coupled with the high degree of scalability make this material an ideal candidate for next-generation anodes for electric vehicle applications. C-coated SiNF paper electrodes offer a highly feasible alternative to the traditional slurry-based approach to Li-ion battery electrodes through the elimination of carbon black, polymer binders, and metallic current collectors.

Following are examples of one possible method, according to an embodiment of the invention.

SiO$_2$ NF Synthesis

Two solutions comprising TEOS:EtOH 1:2 (mol:mol) and H$_2$O:HCl 200:1 (mol:mol) are prepared separately under vigorous stirring. The H$_2$O:HCl solution is then added drop-wise into the TEOS:EtOH solution under stirring to produce a sol with a 1:1 EtOH:H$_2$O molar ratio. The sol is aged at 70° C. for 2 hours, loaded into a polypropylene syringe, and connected to an Inovenso Nanospinner Ne300 multinozzle electrospinner. The tip-to-collector distance was held constant at 12 cm and the applied voltage was 30 kV. The SiO$_2$ NF paper sheets were removed from the collector, placed in a vacuum oven at 200° C., and dried overnight under vacuum.

C-Coated SiNF Synthesis

SiO$_2$ NF paper is cut into strips and loaded into steel-capped brass union Swagelok reactors with −50 mesh Mg powder in a SiO$_2$:Mg weight ratio of 1:1. The reactors are sealed in an Ar-filled glovebox (0.05 ppm O$_2$) and immediately transferred to an MTI GSL1600X quartz tube furnace. The furnace is purged with Ar, heated at 5° C./min to 700° C., held for 2 hours, and finally cooled under forced convection to room temperature. As-reduced paper strips are submerged in 2M HCl for 3 hours to remove MgO and then rinsed several times with DI H$_2$O and EtOH. Etched SiNF paper strips are dried overnight under vacuum at 105° C. SiNF paper was loaded into an MTI GSL1600X furnace in a quartz boat and heated to 950° C. in 15 minutes under a flow of 0.180 SLM Ar and 30.0 SCCM H$_2$ at 700 torr. At 950° C., 30 SCCM C$_2$H$_2$ was introduced for 15 minutes and then the system was cooled to room temperature under flow of Ar:H$_2$.

Battery Characterization

C-coated SiNF paper was cut to fit inside 2032-type coin cells. Celgard 3501 PP was used for separators. Li metal was used as the counterelectrode with a 1:1 EC:DMC (v:v) electrolyte with a 3% vol. VC additive for improved cycle life. Charge-discharge cycling was performed on an Arbin BT300 and cyclic voltammetry (CV) and potentiostatic electrochemical impedance spectroscopy (PEIS) measurements were performed on a Biologic VMP3. All capacity values were calculated on the total electrode weight (carbon+silicon). Capacity was determined using 1 C=4 Ag$^{-1}$ and CV was performed using a scan rate of 0.05 mVs$^{-1}$.

Figure 6:
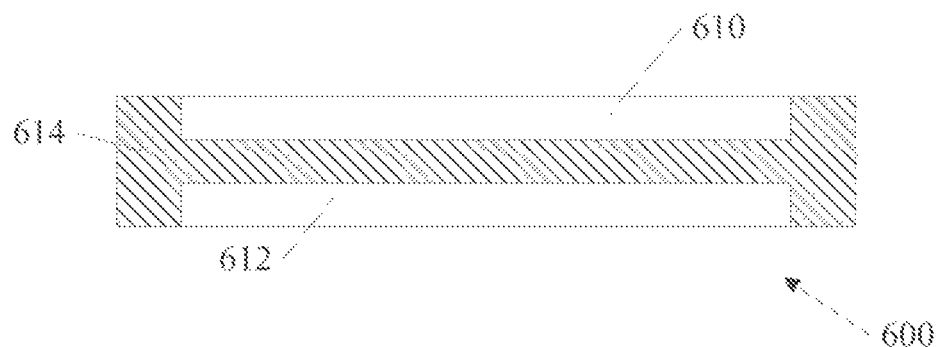
FIG. 6 shows a battery according to an example of the invention.

FIG. 6 shows an example of a battery 600 according to an embodiment of the invention. The battery 600 is shown including an anode 610 and a cathode 612. An electrolyte 614 is shown between the anode 610 and the cathode 612. In one example, the battery 600 is a lithium-ion battery. In one example, the anode 610 is formed from a porous silicon fiber as described in examples above. In one example, although the invention is not so limited, the battery 600 is formed to comply with a 2032 coin type form factor.

Figure 7:
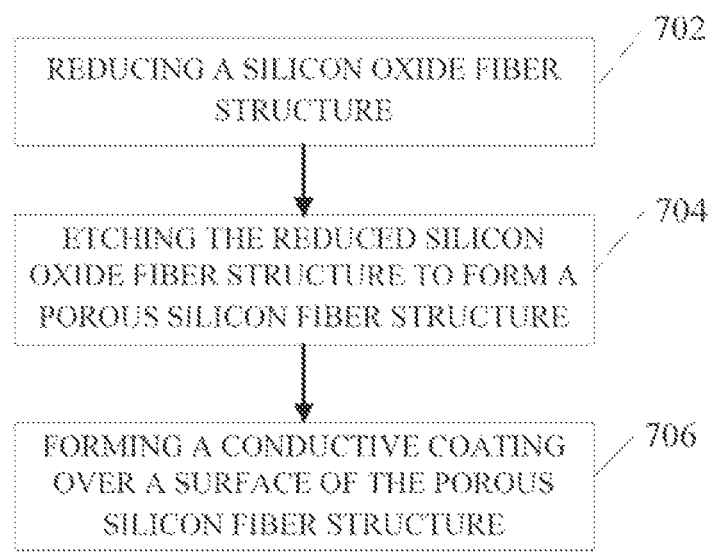
FIG. 7 shows a method of forming a material according to an example of the invention.

FIG. 7 shows an example method of forming according to an embodiment of the invention. In operation 702, a silicon oxide fiber is reduced. In operation 704, the reduced silicon oxide fiber is etched to form a porous silicon fiber. In operation 706, a conductive coating is formed over a surface of the porous silicon fiber. In the present disclosure, the term "conductive" is used relative to the porous silicon fiber structure. Any material more conductive than the porous silicon fiber may be considered to be a conductor for the purposes of the claims.

To better illustrate the method and apparatuses disclosed herein, a non-limiting list of embodiments is provided here:

Example 1 includes a battery. The battery includes a first electrode, including a number of porous silicon fibers, a conductive coating covering a surface portion of the porous silicon fibers. The battery further includes a second electrode, and an electrolyte in contact with both the first electrode and the second electrode.

Example 2 includes the battery of example 1, wherein the number of porous silicon fibers have a characteristic dimension smaller than approximately 150 nm.

Example 3 includes the battery of any one of examples 1-2, wherein the conductive coating includes carbon.

Example 4 includes the battery of any one of examples 1-3, wherein the second electrode includes lithium metal.

Example 5 includes the battery of any one of examples 1-4, wherein the electrolyte includes a mixture of ethylene carbonate and dimethyl carbonate.

Example 6 includes a method of forming a battery electrode. The method includes reducing a silicon oxide fiber structure, etching the reduced silicon oxide fiber structure to form a porous silicon fiber structure, and forming a conductive coating over a surface of the porous silicon fiber structure.

Example 7 includes the method of example 6, wherein reducing a silicon oxide fiber structure include magnesiothermically reducing the silicon oxide fiber structure.

Example 8 includes the method of any one of examples 6-7, wherein etching the reduced silicon oxide fiber structure includes selective etching of magnesium oxide sites after magnesiothermic reduction.

Example 9 includes the method of any one of examples 6-8, wherein forming a conductive coating includes pyrolizing an amorphous carbon coating over the surface of the porous silicon.

Example 10 includes a method of forming a battery electrode. The method includes electrospinning a silicon oxide fiber structure, reducing the silicon oxide fiber structure, etching the reduced silicon oxide fiber structure to form a porous silicon fiber structure, and forming a conductive coating over a surface of the porous silicon fiber structure.

Example 11 includes the method of example 10, wherein electrospinning the silicon oxide fiber structure includes electrospinning a TEOS solution to form a silicon oxide fiber structure.

Example 12 includes the method of any one of examples 10-11, wherein electrospinning the silicon oxide fiber structure includes electrospinning a planar silicon oxide paper on a collector plate.

These and other examples and features of the present infusion devices, and related methods will be set forth in part in the above detailed description. This overview is intended to provide non-limiting examples of the present subject matter—it is not intended to provide an exclusive or exhaustive explanation.

While a number of advantages of embodiments described herein are listed above, the list is not exhaustive. Other advantages of embodiments described above will be apparent to one of ordinary skill in the art, having read the present disclosure. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A battery, comprising:
   a first electrode, including:
   a number of porous silicon fibers;
   a conductive coating covering a surface portion of the porous silicon fibers;
   a second electrode; and
   an electrolyte in contact with both first electrode and the second electrode.

2. The battery of claim 1, wherein the number of porous silicon fibers have a characteristic dimension smaller than approximately 150 nm.

3. The battery of claim 1, wherein the conductive coating includes carbon.

4. The battery of claim 1, wherein the second electrode includes lithium metal.

5. The battery of claim 1, wherein the electrolyte includes a mixture of ethylene carbonate and dimethyl carbonate.

6. A method of forming a battery electrode, comprising:
   reducing a silicon oxide fiber structure;
   etching the reduced silicon oxide fiber structure to form a porous silicon fiber structure; and
   forming a conductive coating over a surface of the porous silicon fiber structure.

7. The method of claim 6, wherein reducing a silicon oxide fiber structure include magnesiothermically reducing the silicon oxide fiber structure.

8. The method of claim 7, wherein etching the reduced silicon oxide fiber structure includes selective etching of magnesium oxide sites after magnesiothermic reduction.

9. The method of claim 6, wherein forming a conductive coating includes pyrolizing an amorphous carbon coating over the surface of the porous silicon.

10. A method of forming a battery electrode, comprising:
    electrospinning a silicon oxide fiber structure;
    reducing the silicon oxide fiber structure;
    etching the reduced silicon oxide fiber structure to form a porous silicon fiber structure; and
    forming a conductive coating over a surface of the porous silicon fiber structure.

11. The method of claim 10, wherein electrospinning the silicon oxide fiber structure includes electrospinning a TEOS solution to form a silicon oxide fiber structure.

12. The method of claim 10, wherein electrospinning the silicon oxide fiber structure includes electrospinning a planar silicon oxide paper on a collector plate.

13. The battery of claim 1, wherein a weight percentage of silicon in the first electrode is greater than 80%.

14. The battery of claim 3, wherein a thickness of the conductive coating is approximately 4 nm.

* * * * *